(12) United States Patent
Nozawa (10) Patent No.: US 6,360,018 B1
(45) Date of Patent: *Mar. 19, 2002

(54) IMAGE PROCESSING APPARATUS AND METHOD

(75) Inventor: Shingo Nozawa, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/942,843

(22) Filed: Oct. 3, 1997

(30) Foreign Application Priority Data

Apr. 10, 1996 (JP) .............................................. 8-264501
Apr. 10, 1996 (JP) .............................................. 8-264502

(51) Int. Cl.$^7$ ................................................ G06K 9/36
(52) U.S. Cl. ...................... 382/248; 382/233; 382/299; 358/433; 375/240.24; 375/240.25
(58) Field of Search ................................. 382/248, 250, 382/298, 300, 299, 233, 232; 348/445, 403, 404, 420, 421; 386/111, 123–124; 375/240.18, 240.2, 240.21, 240.24, 240.25; 358/435

(56) References Cited

U.S. PATENT DOCUMENTS

| | | | | |
|---|---|---|---|---|
| 5,418,620 A | * | 5/1995 | Nishino et al. | 386/111 |
| 5,452,104 A | * | 9/1995 | Lee | 358/433 |
| 5,548,337 A | * | 8/1996 | Kang | 348/445 |
| 5,793,434 A | * | 8/1998 | Lee | 348/445 |
| 5,856,849 A | * | 1/1999 | Aihara | 348/445 |
| 5,875,039 A | * | 2/1999 | Ohsawa et al. | 358/433 |
| 5,953,456 A | | 9/1999 | Ikeda et al. | 382/232 |
| 5,963,678 A | * | 10/1999 | Nozawa | 382/299 |

* cited by examiner

Primary Examiner—Leo Boudreau
Assistant Examiner—Ishrat Sherali
(74) Attorney, Agent, or Firm—Fitzpatrick, Cella, Harper & Scinto

(57) ABSTRACT

Image processing apparatus/method, wherein a plurality of kinds of video signals in which aspect ratios of an image are different are selectively inputted and a predetermined arithmetic operation is executed by using predetermined coefficients selected in accordance with the kind of inputted video signal, thereby orthogonally transforming the inputted video signal. Image processing apparatus/method, wherein a video signal which was orthogonally transformed and encoded is inputted, the inputted video signal is inversely orthogonally transformed by performing a predetermined arithmetic operation by using predetermined coefficients, and the inversely orthogonally transformed video signal is outputted, and in the arithmetic operating process, the coefficients for use in the predetermined arithmetic operation are selected in accordance with an aspect ratio of the video signal when it is outputted. Image processing apparatus/method, wherein (m×n) signals are collected from an input signal train and divided into blocks, the signals divided into the blocks are converted into blocks of (i×j) signals, and the signals converted into the blocks are orthogonally transformed on a unit basis of those blocks. Image processing apparatus/method, wherein encoded signals obtained by encoding signals divided into blocks by (m×n) signals are inversely orthogonally transformed on a unit basis of those blocks, the inversely orthogonally transformed signals are converted into blocks of (i×j) signals, and each of the blocks converted is connected, thereby reconstructing a video signal.

23 Claims, 8 Drawing Sheets

IMAGE PROCESSING APPARATUS AND METHOD

BACKGROUND OF THE INVENTION

1. Field of the Invention

The invention relates to an image processing apparatus and method and, more particularly, to an apparatus and method for encoding/decoding image data.

2. Related Background Art

In recent years, by the advancement of a digital signal processing technique, a large amount of digital information such as moving images, still images, audio sound, or the like is high efficient encoded and can be recorded to a small magnetic medium or can be transmitted to a communication medium. Various examinations have been made with respect to an apparatus for encoding various video signals having different aspect ratios of the picture plane into a signal train of a common format by applying such a technique.

Figure 1:
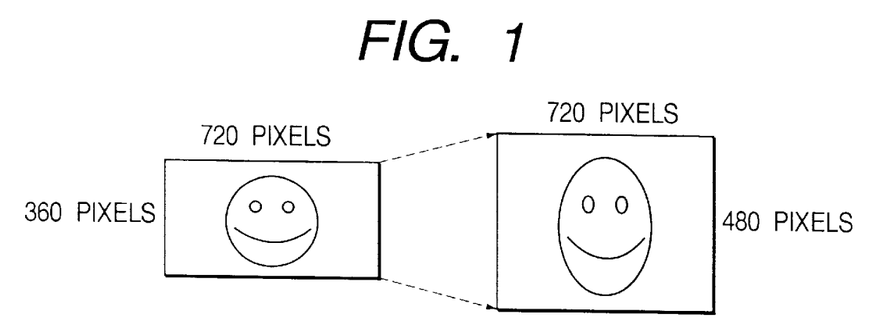
FIG. 1 is a diagram showing a conversion from a video image of an aspect ratio of (9:16) to a video image of an aspect ratio of (3:4)

For example, as shown in FIG. 1, there is considered an encoding apparatus such that a wide video signal having an aspect ratio of (9:16) of 360 pixels in the vertical direction and 720 pixels in the lateral direction is converted into a standard video signal having an aspect ratio of (3:4) of 480 pixels in the vertical direction and 720 pixels in the lateral direction, thereby commonly using an encoding circuit of the standard video signal.

Figure 2:
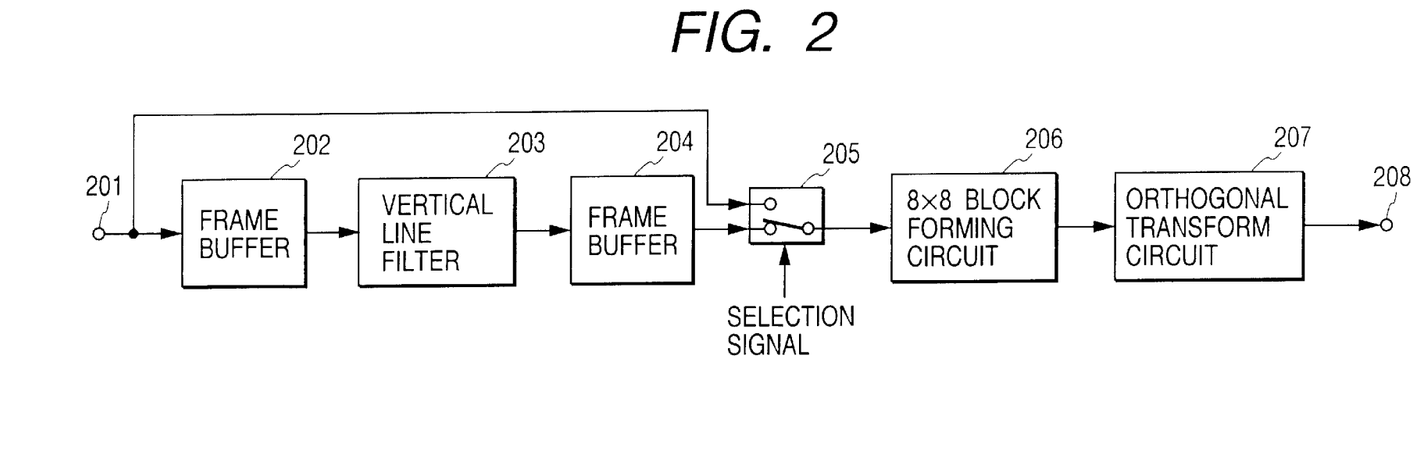
FIG. 2 is a block diagram showing an example of a construction of a conventional encoding apparatus.

FIG. 2 is a block diagram showing an example of a construction of a conventional encoding apparatus.

In FIG. 2, reference numeral 201 denotes an input terminal of a video signal; 202 and 204 frame buffers; 203 a vertical line filter; 205 a change-over switch; 206 a block forming circuit; 207 an orthogonal transform circuit; and 208 an output terminal.

The operation will now be described.

Figure 3A:
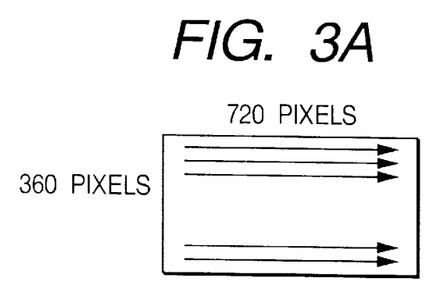
FIGS. 3A and 3B are diagrams each showing a scanning order of a video signal.
Figure 3B:
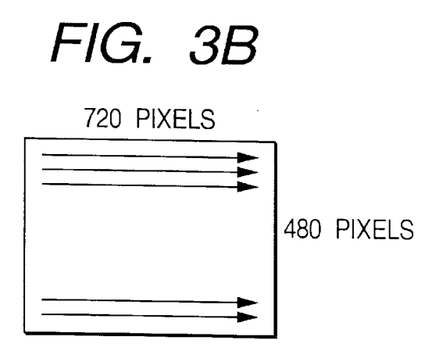

An input video signal which is supplied to the input terminal 201 is a wide video signal having an aspect ratio of (9:16) of 360×720 pixels shown in FIG. 3A or a standard video signal having an aspect ratio of (3:4) of 480×720 pixels shown in FIG. 3B and comprises scanning lines in the horizontal direction as shown in the diagrams. In this apparatus, therefore, the wide video signal of one picture plane is stored into the frame buffer 202 and is rearranged to a signal train in the vertical direction. A converting process in the vertical direction is performed by the vertical line filter 203.

The vertical line filter 203 is an interpolation filter for converting a wide video image into a standard video image and converts the video image from 360 pixels to 480 pixels. Since an output of the vertical line filter 203 has the pixel train in the vertical direction, it is again rearranged into the scanning lines in the horizonal direction by the frame buffer 204.

The change-over switch 205 selects either one of the signal trains which are supplied from the frame buffer 204 and input terminal 201 and supplies the selected signal train to the block forming circuit 206 in accordance with a selection signal. That is, when the signal that is supplied to the input terminal 201 is the wide video signal of 360×720 pixels, the signal train from the frame buffer 204 is selected. When the signal which is supplied to the input terminal 201 is the standard video signal of 480×720 pixels, the signal train applied to the input terminal 201 is selected.

The block forming circuit 206 divides the signal train supplied from the change-over switch 205 into blocks on a unit basis of 8 pixels (in the vertical direction)×8 pixels (in the lateral direction). The (8×8)-pixel blocks are 2-dimensional discrete cosine transformed by the orthogonal transform circuit 207 and are outputted from the output terminal 208.

In the encoding apparatus as mentioned above, in order to convert a resolution of the video image, storage elements of the frame units, such as frame buffers 202 and 204, are necessary, and undesirably increase the overall size of the apparatus. Further, it takes a long processing time for the converting process.

SUMMARY OF THE INVENTION

In consideration of the above background, it is an object of the present invention to provide an image processing apparatus and method which can encode/decode even various image data in which pixel constructions of one picture plane are different by using a common encoding circuit without enlarging a circuit scale and without substantially changing a conventional processing time.

According to one preferred embodiment of the invention, the above object is accomplished by an image processing apparatus/method, wherein a plurality of kinds of video signals in which aspect ratios of an image are different are selectively inputted and, by executing a predetermined arithmetic operation by using a predetermined coefficient selected in accordance with the kind of inputted video signal, the inputted video signal is orthogonally transformed.

According to another preferred embodiment, there is provided an image processing apparatus/method, wherein a video signal which was orthogonally transformed and encoded is inputted and the inputted video signal is inversely orthogonally transformed by executing a predetermined arithmetic operation by using a predetermined coefficient, and the inversely orthogonally transformed video signal is outputted. The arithmetic operating process selects the coefficient to be used for the predetermined arithmetic operation in accordance with the aspect ratio of the video signal.

According to still another preferred embodiment, there is provided an image processing apparatus/method, wherein (m×n) signals are collected from an input signal train and are divided into blocks, the signals of the divided blocks are converted into (i×j) signals of blocks, and the block converted signals are orthogonally transformed on a block unit basis.

According to further another preferred embodiment, there is provided an image processing apparatus/method, wherein an encoded signal obtained by encoding a signal divided into blocks by (m×n) signals is inversely orthogonally transformed on the block unit basis, the inversely orthogonally transformed signal is converted into (i×j) signals of blocks, and each of the block converted blocks is connected, thereby reconstructing a video signal.

Other objects, features and advantages of the invention will become apparent from the following detailed description taken in conjunction with the accompanying drawings.

DETAILED DESCRIPTION OF THE PREFERRED EMBODIMENTS

Embodiments of the present invention will now be described hereinbelow with reference to the drawings.

Figure 4:
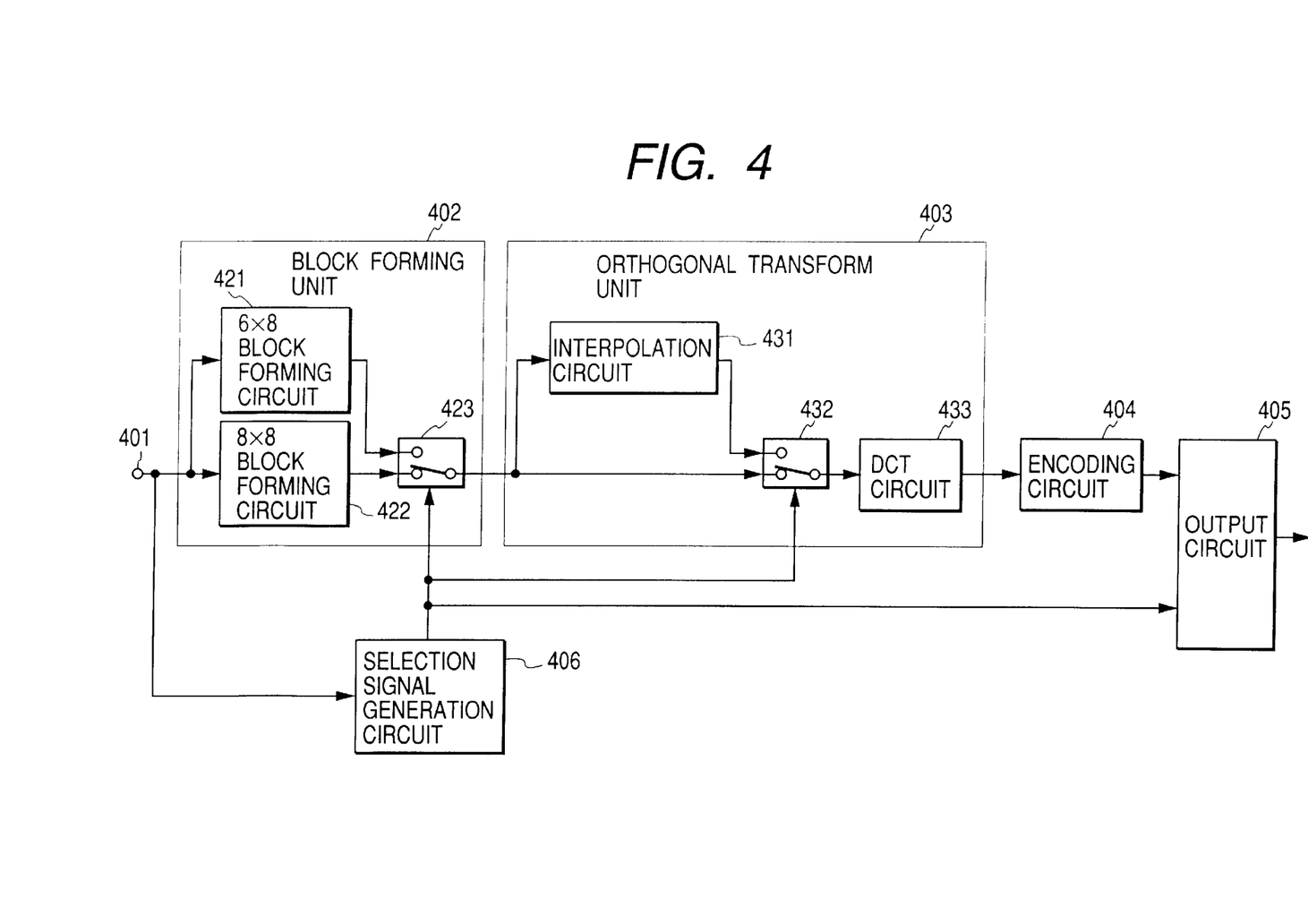
FIG. 4 is a block diagram showing the first embodiment of an encoding apparatus according to the invention.

FIG. 4 is a block diagram showing the first embodiment of an encoding apparatus according to the invention.

In FIG. 4, a standard video signal having an aspect ratio of (3:4) constructed by 480×720 pixels or a wide video signal having an aspect ratio of (9:16) constructed by 360×720 pixels can be inputted from an input terminal 401.

In a block forming unit 402, the video signal which is inputted from the input terminal 401 is divided into blocks of a finite number of pixels in accordance with a selection signal outputted from a selection signal generation circuit 406.

The selection signal which is generated from the selection signal generation circuit 406 is a signal indicating whether the signal inputted from the input terminal 401 is the standard video signal or the wide video signal. The selection signal generation circuit 406 has a manual mode for the user to set the selection signal by a manual operation and an auto mode to automatically discriminate the inputted video signal and output the selection signal.

The block forming unit 402 is made up of a 6×8 block forming circuit 421, an 8×8 block forming circuit 422, and a change-over switch 423. When the inputted video signal is the standard video signal, the block forming unit 402 divides the inputted video signal into block data each comprising 8 pixels (in the vertical direction)×8 pixels (in the lateral direction) by the 8×8 block forming circuit 422 and outputs the divided block data. When the inputted video signal is the wide video signal, the inputted video signal is divided into block data each comprising 6 pixels (in the vertical direction)×8 pixels (in the lateral direction) by the 6×8 block forming circuit 421 and the divided block data is outputted. The change-over switch 423 is controlled by the selection signal.

In an orthogonal transform circuit 403, the block data which is supplied from the block forming unit 402 is orthogonally transformed in response to the selection signal.

The orthogonal transform unit 403 is constructed by an interpolation circuit 431, a change-over switch 432, and a 2-dimensional discrete cosine transform (DCT) circuit 433.

In the orthogonal transform unit 403, when the block data which is supplied from the block forming unit 402 is block data each comprising (6×8) pixels, the pixels in the vertical direction of the blocks are interpolated by the interpolation circuit 431 and converted into block data each comprising (8×8) pixels. After that, the block data is 2-dimensional discrete cosine transformed by the DCT circuit 433. On the other hand, when the block data which is supplied from the block forming unit 402 is block data each comprising (8×8) pixels, the block data is 2-dimensional discrete cosine transformed as it is by the DCT circuit 433 through the change-over switch 432. The change-over switch 432 is controlled by the selection signal.

In an encoding circuit 404, the block data transformed by the orthogonal transform unit 403 is quantized and encoded.

In accordance with the selection signal, an output circuit 405 generates the video signal encoded as mentioned above and an identification signal (ID signal) indicating whether the encoded video signal is a signal which was interpolated by the interpolation circuit 431 and encoded or not.

Figure 5:
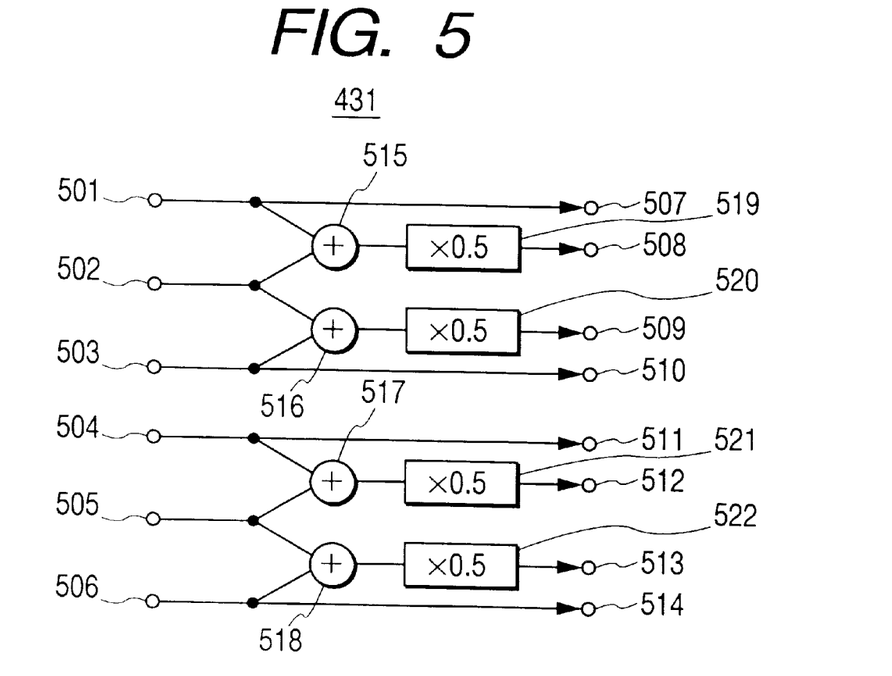
FIG. 5 is a block diagram showing a construction of an interpolation circuit 431.

A detailed construction of the interpolation circuit 431 will now be described.

FIG. 5 is a block diagram showing the construction of the interpolation circuit 431.

Pixel signals of six pixels in the vertical direction of each of the (6×8) pixel blocks are inputted to six input terminals 501 to 506. The signal of the first line and the signal of the second line in each block are added by an adder 515. The signal of the second line and the signal of the third line in each block are added by an adder 516. Addition outputs are multiplied by 0.5 by multipliers 519 and 520, respectively, and are averaged.

Likewise, the signals of the fourth and fifth lines are added by an adder 517 and the signals of the fifth and sixth lines are added by an adder 518, respectively. Addition outputs are multiplied by 0.5 by multipliers 521 and 522, respectively, and are averaged.

The signals of the first, third, fourth, and sixth lines are outputted as they are from output terminals 507, 510, 511, and 514, respectively. Average outputs of the multipliers 519 to 522 are outputted from output terminals 508, 509, 512, and 513, respectively. In this manner, the signals of six pixels in the vertical direction can be interpolated to the signals of eight pixels in the vertical direction.

An orthogonal transform coefficient signal of the (8×8)-pixel blocks converted by the orthogonal transform unit 403 as mentioned above is encoded by the encoding circuit 404 and the encoded signal is outputted from the output circuit 405.

The interpolation circuit 431 is not limited to only the interpolating process in the vertical direction but can also perform an interpolating process in the horizontal direction and change the aspect ratio of the block data which is outputted from the block forming circuit 421 in accordance with a processing result.

A decoding apparatus for decoding the video signal encoded by the encoding apparatus of the embodiment will now be described.

Figure 6:
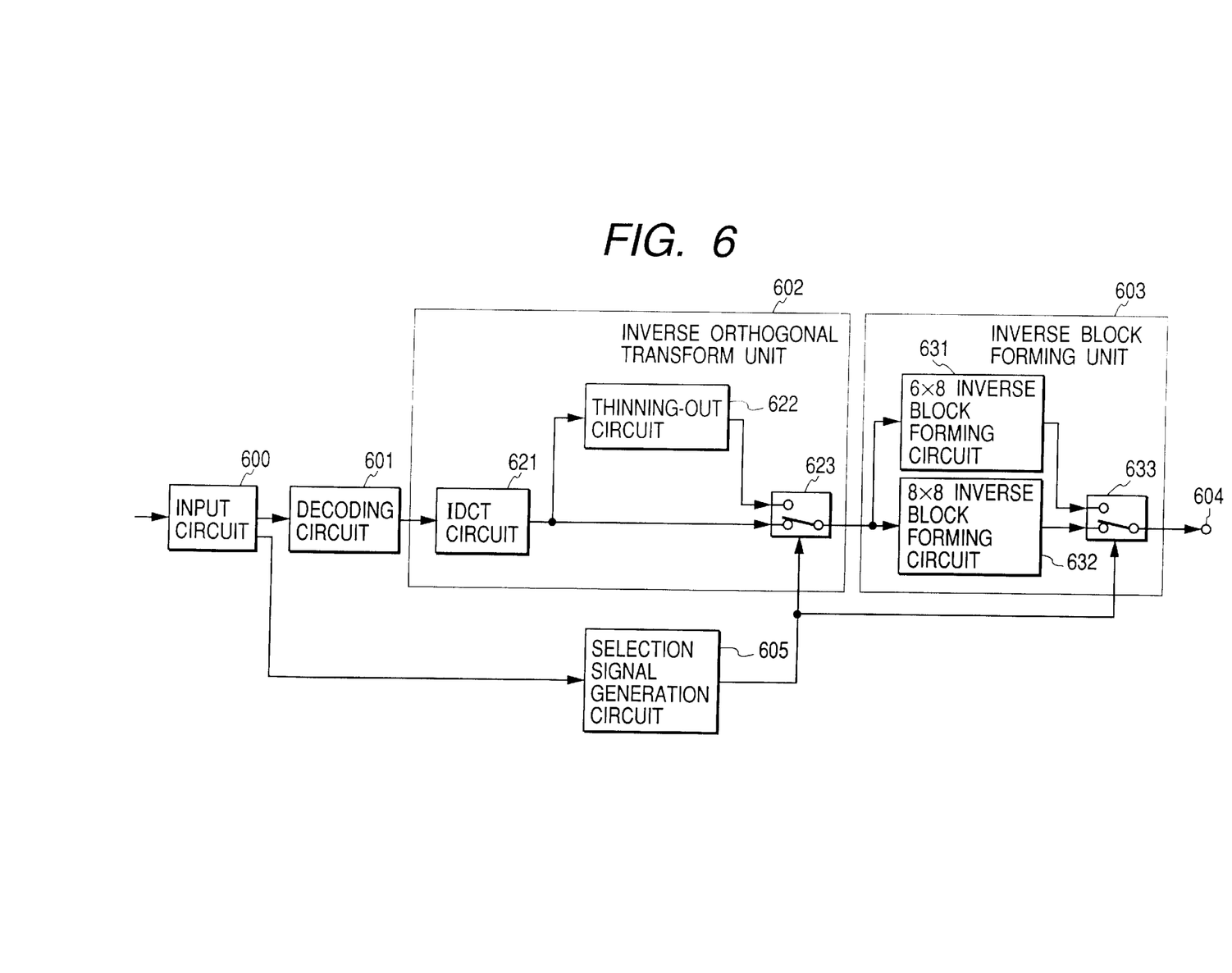
FIG. 6 is a block diagram showing the first embodiment of a decoding apparatus for decoding the video signal encoded by the encoding apparatus of the embodiment according to the invention.

FIG. 6 is a block diagram showing the first embodiment of the decoding apparatus for decoding the video signal encoded by the encoding apparatus of the embodiment according to the invention.

In FIG. 6, the video signal encoded on an (8×8) pixel block unit basis is inputted from an input circuit 600. The ID signal is also inputted to the input circuit 600 together with the encoded video signal.

A decoding circuit 601 decodes the encoded video signal into orthogonal transform coefficient data.

In an inverse orthogonal transform unit 602, orthogonal transform coefficient data which is inputted from the decoding circuit 601 is subjected to an inverse orthogonal transformation in response to a selection signal from a selection signal generation circuit 605 and the transformed data is supplied to an inverse block forming unit 603.

The selection signal generation circuit 605 has an auto mode for automatically selecting thinning-out and inverse orthogonal transforming processes on the basis of the ID signal from the input circuit 600 and a manual mode for the user to select. The selection signal generation circuit 605 generates a selection signal in accordance with the set mode.

The inverse orthogonal transform unit 602 is made up of an inverse 2-dimensional discrete cosine transform (IDCT) circuit 621, a thinning-out circuit 622, and a change-over switch 623.

When the signal to be decoded is the encoded video signal of the wide video image comprising 360 pixels (in the vertical direction)×720 pixels (in the lateral direction), the inverse orthogonal transform unit 602 executes a thinning-out process in order to convert the inverse discrete cosine transformed signal from the (8×8)-pixel blocks to the (6×8)-pixel blocks. When the signal to be decoded is the encoded video signal that is decoded to the standard video image comprising (480×720) pixels, the inverse discrete cosine transformed signal is outputted as it is. Such an output switching operation is executed by the change-over switch 623 in accordance with the selection signal from the selection signal generation circuit 605.

Figure 7:
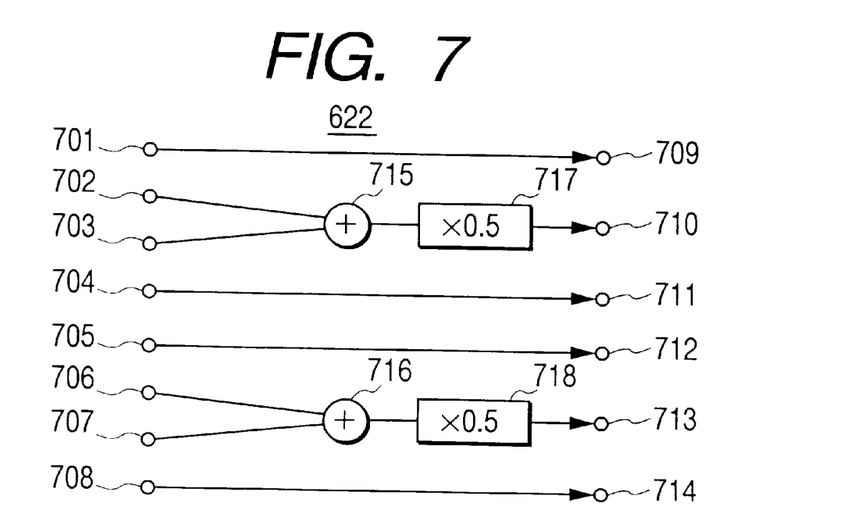
FIG. 7 is a block diagram showing a construction of a thinning-out circuit 622.

A detailed construction of the thinning-out circuit 622 will now be described.

FIG. 7 is a block diagram showing the construction of the thinning-out circuit 622.

In FIG. 7, pixel signals of eight pixels in the vertical direction are inputted to input terminals 701 to 708, respectively. The signals of the first, fourth, fifth, and eighth lines are outputted as they are from output terminals 709, 711, 712, and 714. The signals of the second and third lines are added by an adder 715 and an addition output is multiplied by 0.5 by a multiplier 717, thereby averaging. An averaged signal is outputted from an output terminal 710.

Further, the signals of the sixth and seventh lines are added by an adder 716 and an addition output is multiplied by 0.5 by a multiplier 718, thereby averaging. The averaged signal is outputted from an output terminal 713. In this manner, the signals of eight pixels in the vertical direction are thinned out to six pixels and can be returned to the original (6×8)-pixel blocks.

Subsequently, the inverse block forming unit 603 is constructed by an 6×8 inverse block forming circuit 631, an 8×8 inverse block forming circuit 632, and a change-over switch 633. The inverse block forming unit 603 forms an image of one picture plane by connecting blocks in accordance with a size of blocks which are supplied. Either one of an output of the 6×8 inverse block forming circuit 631 and an output of the 8×8 inverse block forming circuit 632 is selectively outputted by the change-over switch 633 in accordance with a selection signal from the selection signal generation circuit 605.

The signal converted by the inverse block forming unit 603 as mentioned above is outputted from an output terminal 604.

The thinning-out circuit 622 is not limited to only the thinning-out process in the vertical direction but can also perform the thinning-out process in the horizontal direction and change an aspect ratio of the video signal which is outputted from the inverse block forming circuit 631 in accordance with a processing result.

Figure 8:
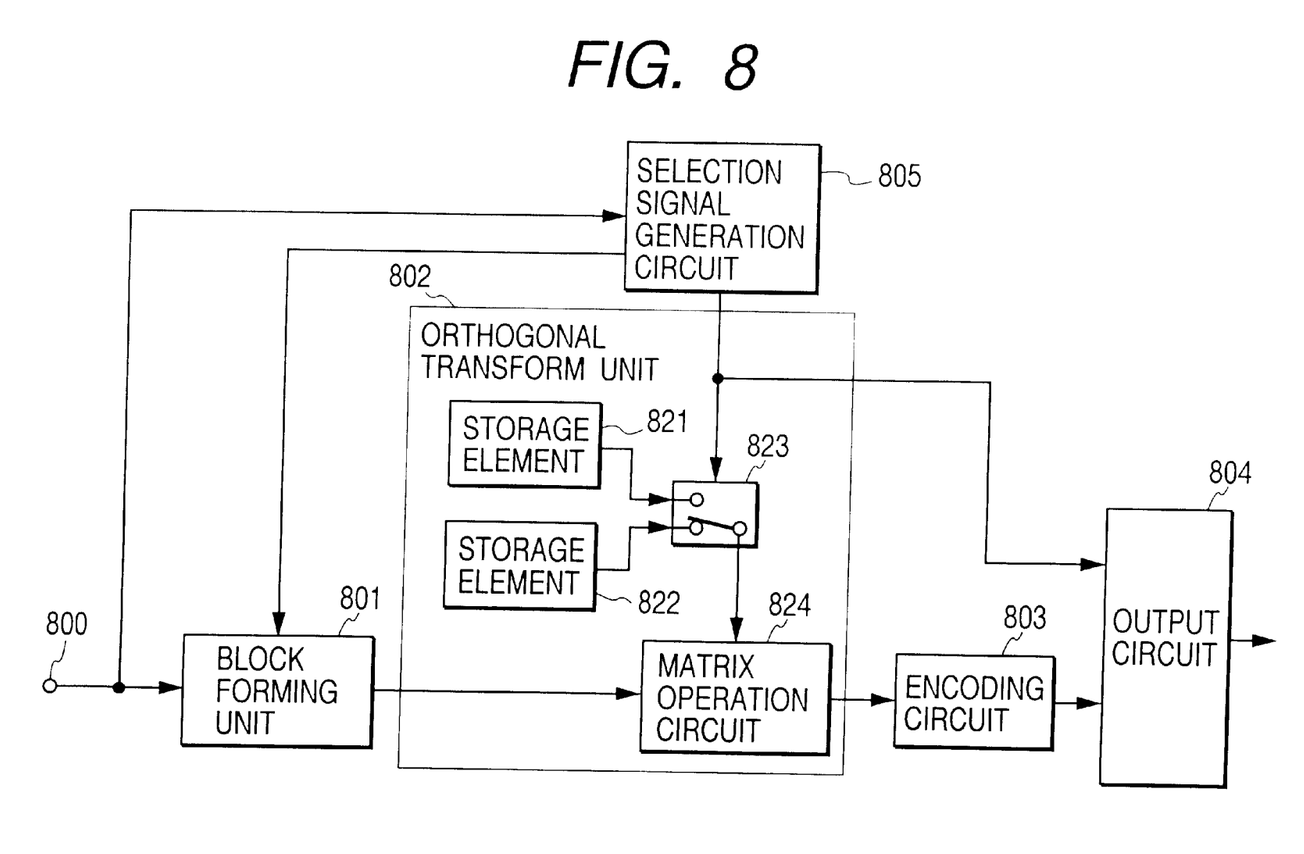
FIG. 8 is a block diagram showing the second embodiment of an encoding apparatus according to the invention.

FIG. 8 is a block diagram showing the second embodiment of an encoding apparatus according to the invention.

In FIG. 8, a standard video signal having an aspect ratio of (3:4) comprising 480 pixels (in the vertical direction)× 720 pixels (in the lateral direction) or a wide video signal having an aspect ratio of (9:16) comprising (360×720 pixels) can be inputted to an input terminal 800.

When the inputted video signal is a standard video signal, a block forming unit 801 divides the inputted video signal into block data each comprising 8 pixels (in the vertical direction)×8 pixels (in the lateral direction) and outputs the divided block data. When the inputted video signal is a wide video signal, the block forming unit 801 divides the inputted video signal into block data each comprising 6 pixels (in the vertical direction)×8 pixels (in the lateral direction) and outputs the divided block data. The switching operation of the block division is controlled by a selection signal which is generated from a selection signal generation circuit 805.

The selection signal which is generated from the selection signal generation circuit 805 is a signal indicating whether the signal inputted from the input terminal 800 is the standard video signal or the wide video signal. The selection signal generation circuit 805 has a manual mode for the user to set the selection signal by a manual operation and an auto mode to automatically discriminate the inputted video signal and output the selection signal.

An orthogonal transform unit 802 orthogonally transforms the video signal which is supplied from the block forming unit 801.

An encoding circuit 803 quantizes the video signal transformed by the orthogonal transform unit 802, encodes the quantized video signal, and outputs the encoded signal to an output circuit 804.

In the embodiment, the orthogonal transform unit 802 is constructed by storage elements 821 and 822, a change-over switch 823, and a matrix operation circuit 824. The orthogonal transform unit 802 performs a matrix arithmetic operation by using a coefficient stored in either one of the storage elements 821 and 822 and outputs an operation result to the encoding circuit 803.

That is, when the signal which is supplied to the input terminal 800 is the wide video signal comprising (360×720) pixels, it is divided into blocks each comprising 6 pixels (in the vertical direction)×8 pixels (in the lateral direction) by the block forming unit 801. The block data is subjected to a matrix arithmetic operation by the coefficient stored in the storage element 821 by a matrix shown in the expression (1) shown below. When the signal which is supplied to the input terminal 800 is the standard video signal comprising (480× 720 pixels), it is divided into blocks each comprising 8 pixels (in the vertical direction)×8 pixels (in the lateral direction) by the block forming unit 801. The block data is subjected to a matrix arithmetic operation by the coefficient stored in the storage element 822 by a matrix shown in the expression (2) shown below.

The expression (1) is a product of the matrix of the expression (2) and a matrix of the expression (3). The expression (3) is a matrix to convert six pixels in the vertical direction into eight pixels.

$$\begin{bmatrix} 1.5C_4 & C_4 & 1.5C_4 & 1.5C_4 & C_4 & 1.5C_4 \\ C_1 + 0.5C_3 & 0.5C_3 + 0.5C_5 & 0.5C_5 + C_7 & -C_7 - 0.5C_5 & -0.5C_5 - 0.5C_3 & -0.5C_3 - C_1 \\ C_2 + 0.5C_6 & 0.5C_6 - 0.5C_6 & -0.5C_6 - C_2 & -C_2 - 0.5C_6 & -0.5C_6 + 0.5C_6 & 0.5C_6 + C_2 \\ C_3 - 0.5C_7 & -0.5C_7 - 0.5C_1 & -0.5C_1 - C_5 & C_5 + 0.5C_1 & 0.5C_1 + 0.5C_7 & 0.5C_7 - C_3 \\ C_4 - 0.5C_4 & -0.5C_4 - 0.5C_4 & -0.5C_4 + C_4 & C_4 - 0.5C_4 & -0.5C_4 - 0.5C_4 & -0.5C_4 + C_4 \\ C_5 - 0.5C_1 & -0.5C_1 + 0.5C_7 & 0.5C_7 + C_3 & -C_3 - 0.5C_7 & -0.5C_7 + 0.5C_1 & 0.5C_1 - C_5 \\ C_6 - 0.5C_2 & -0.5C_2 + 0.5C_2 & 0.5C_2 - C_6 & -C_6 + 0.5C_2 & 0.5C_2 - 0.5C_2 & -0.5C_2 + C_6 \\ C_7 - 0.5C_5 & -0.5C_5 + 0.5C_3 & 0.5C_3 - C_1 & C_1 - 0.5C_3 & -0.5C_3 + 0.5C_5 & 0.5C_5 - C_7 \end{bmatrix} \quad (1)$$

$$Ci = \frac{\cos\left(\frac{ix}{16}\right)}{2}$$

$$\begin{bmatrix} C_4 & C_4 & C_4 & C_4 & C_4 & C_4 & C_4 & C_4 \\ C_1 & C_3 & C_5 & C_7 & -C_7 & -C_5 & -C_3 & -C_1 \\ C_2 & C_6 & -C_6 & -C_2 & -C_2 & -C_6 & C_6 & C_2 \\ C_3 & -C_7 & -C_1 & -C_5 & C_5 & C_1 & C_7 & -C_3 \\ C_4 & -C_4 & -C_4 & C_4 & C_4 & -C_4 & -C_4 & C_4 \\ C_5 & -C_1 & C_7 & C_3 & -C_3 & -C_7 & C_1 & -C_5 \\ C_6 & -C_2 & C_2 & -C_6 & -C_6 & C_2 & -C_2 & C_6 \\ C_7 & -C_5 & C_3 & -C_1 & C_1 & -C_3 & C_5 & -C_7 \end{bmatrix} \quad (2)$$

$$Ci = \frac{\cos\left(\frac{ix}{16}\right)}{2}$$

$$\begin{bmatrix} 1 & 0 & 0 & 0 & 0 & 0 \\ 0.5 & 0.5 & 0 & 0 & 0 & 0 \\ 0 & 0.5 & 0.5 & 0 & 0 & 0 \\ 0 & 0 & 1 & 0 & 0 & 0 \\ 0 & 0 & 0 & 1 & 0 & 0 \\ 0 & 0 & 0 & 0.5 & 0.5 & 0 \\ 0 & 0 & 0 & 0 & 0.5 & 0.5 \\ 0 & 0 & 0 & 0 & 0 & 1 \end{bmatrix} \quad (3)$$

The video signal transformed by the orthogonal transform unit 802 is quantized and encoded by the encoding circuit 803 and is outputted to the output circuit 804.

Together with the encoded video signal, the ID signal indicating whether the video signal is the standard video signal or the wide video signal is also outputted from the output circuit 804 in accordance with the selection signal.

Although the encoding apparatus has been described above, the change in matrix expression of the inverse orthogonal transformation can be also realized in the decoding apparatus.

Figure 9:
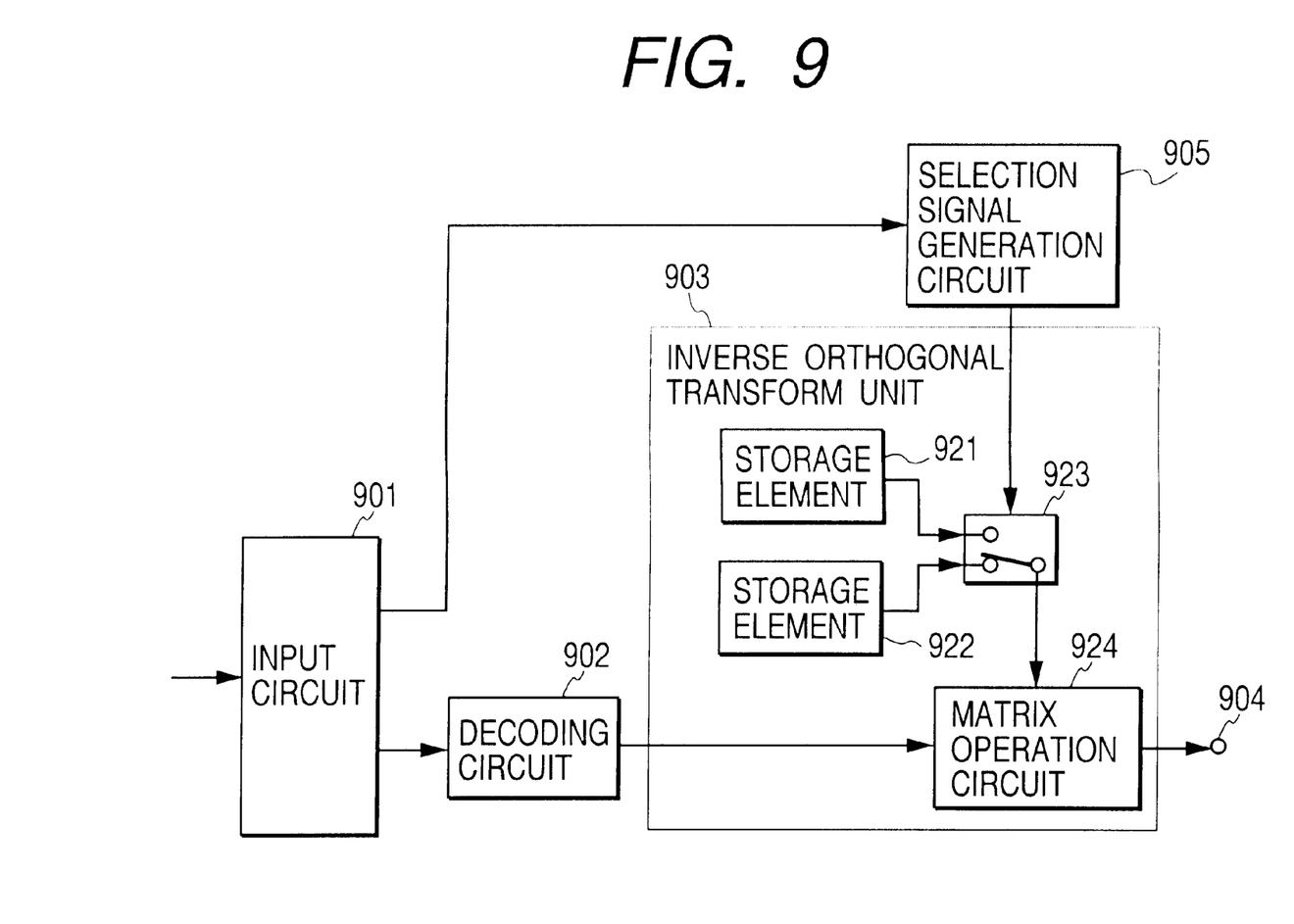
FIG. 9 is a block diagram showing the second embodiment of a decoding apparatus for decoding the video signal encoded by the encoding apparatus of the embodiment according to the invention.

FIG. 9 is a block diagram showing a second embodiment of a decoding apparatus for decoding the video signal encoded by the encoding apparatus of the embodiment according to the invention.

In FIG. 9, a video signal encoded on a (8×8)-pixel block unit basis is inputted to an input circuit 901. In the input circuit 901, the ID signal and the encoded video signal are separated. The separated encoded video signal is decoded into orthogonal transform coefficients by a decoding circuit 902.

In an inverse orthogonal transform unit 903, the orthogonal transform coefficient train which is supplied from the decoding circuit 902 are subjected to an inverse orthogonal transformation in accordance with a selection signal generated from a selection signal generation circuit 905 and are outputted to an output terminal 904.

The inverse orthogonal transform unit 903 is constructed by storage elements 921 and 922, a change-over switch 923, and a matrix operation circuit 924.

The inverse orthogonal transform unit 903 executes a matrix arithmetic operation by using either one of the storage elements 921 and 922 and outputs an operation result to the output terminal 904.

That is, when a signal to be outputted to the output terminal 904 is the signal of the wide video image comprising (720×360) pixels, the matrix arithmetic operation is executed by using the coefficients in the storage element 921. When it is the signal of the standard video image comprising (480×720) pixels, the matrix arithmetic operation is executed by using the coefficients in the storage element 922.

The selection of the matrix arithmetic operation is performed in response to the selection signal generated from the selection signal generation circuit 905.

The selection signal generation circuit 905 has an auto mode to automatically select either one of the matrix arithmetic operations to be performed on the basis of the ID signal and a manual mode for the user to select them. The selection signal generation circuit 905 generates the selection signal in accordance with the set mode.

The coefficients stored in the storage element 921 are represented by a matrix shown in the following expression (4). The coefficients stored in the storage element 922 are represented by a matrix shown in the following expression (5).

The matrix shown in the expression (4) is a product of the matrix shown in the expression (5) and a matrix shown in the following expression (6). The matrix shown in the expression (6) is a matrix to transform eight pixels in the vertical direction into six pixels.

$$\begin{bmatrix} C_4 & -C_1 & C_2 & -C_3 & C_4 & -C_5 & C_6 & -C_7 \\ C_4 & -0.5C_3-0.5C_5 & 0 & 0.5C_7+0.5C_1 & -C_4 & 0.5C_1-0.5C_7 & 0 & 0.5C_5-0.5C_3 \\ C_4 & -C_7 & -C_2 & C_5 & C_4 & -C_3 & -C_6 & C_1 \\ C_4 & C_7 & -C_2 & -C_5 & C_4 & C_3 & -C_6 & -C_1 \\ C_4 & 0.5C_5+0.5C_3 & 0 & -0.5C_1-0.5C_7 & -C_4 & 1.5C_7-0.5C_1 & 0 & 0.5C_3-0.5C_5 \\ C_4 & C_1 & C_2 & C_3 & C_4 & C_5 & C_6 & C_7 \end{bmatrix} \quad (4)$$

$$Ci = \frac{\cos\left(\frac{ix}{16}\right)}{2}$$

$$\begin{bmatrix} C_4 & -C_1 & C_2 & -C_3 & C_4 & -C_5 & C_6 & -C_7 \\ C_4 & -C_3 & C_6 & C_7 & -C_4 & C_1 & -C_2 & C_5 \\ C_4 & -C_5 & -C_6 & C_1 & -C_4 & -C_7 & C_2 & -C_3 \\ C_4 & -C_7 & -C_2 & C_5 & C_4 & -C_3 & -C_6 & C_1 \\ C_4 & C_7 & -C_2 & -C_5 & C_4 & C_3 & -C_6 & -C_1 \\ C_4 & C_5 & -C_6 & -C_1 & -C_4 & C_7 & C_2 & C_3 \\ C_4 & C_3 & C_6 & -C_7 & -C_4 & -C_1 & -C_2 & -C_5 \\ C_4 & C_1 & C_2 & C_3 & C_4 & C_5 & C_6 & C_7 \end{bmatrix} \quad (5)$$

$$Ci = \frac{\cos\left(\frac{ix}{16}\right)}{2}$$

$$\begin{bmatrix} 1 & 0 & 0 & 0 & 0 & 0 & 0 & 0 \\ 0 & 0.5 & 0.5 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 0.5 & 0.5 & 0 \\ 0 & 0 & 0 & 0 & 0 & 0 & 0 & 1 \end{bmatrix} \quad (6)$$

The encoding/decoding apparatus of the embodiment can be applied to various apparatuses. For example, it can be applied to a camera integrated type video recorder as shown in FIG. 10.

Figure 10:
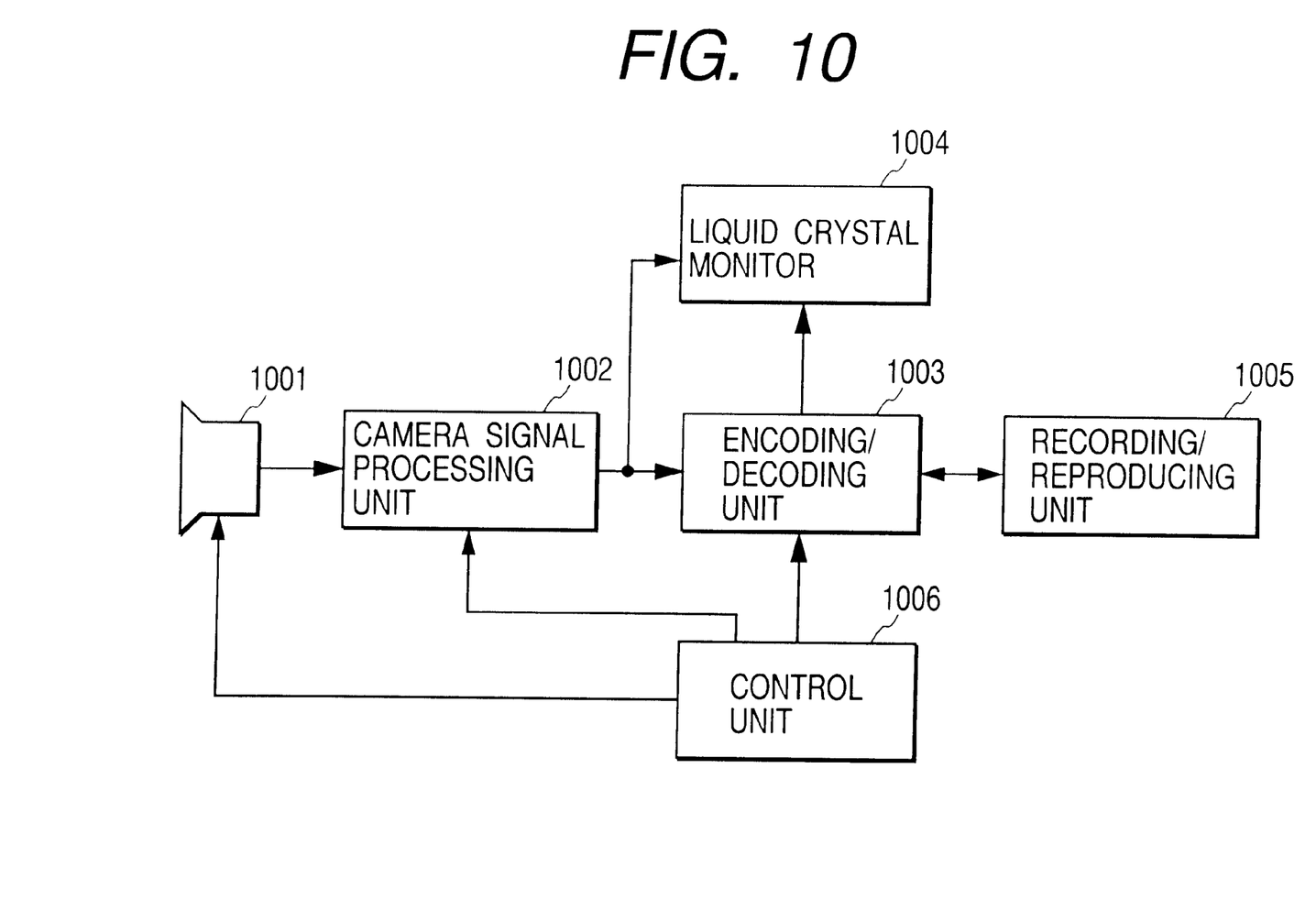
FIG. 10 is a block diagram showing a construction of a camera integrated type video recorder according to the invention.

In FIG. 10, a video signal photographed by an image pickup unit 1001 can be outputted as a standard video signal comprising 480 pixels (in the vertical direction)×720 pixels (in the lateral direction) or a wide video signal comprising 360 pixels (in the vertical direction)×720 pixels (in the lateral direction) in accordance with a control signal from a control unit 1006.

In a camera signal processing unit 1002, a predetermined signal process such as an edge emphasis or the like is executed to the video signal supplied from the image pickup unit 1001 and the processed signal is supplied to an encoding/decoding unit 1003 or a liquid crystal monitor 1004. The camera signal processing unit 1002 is controlled by a control signal from the control unit 1006.

As an encoding/decoding unit 1003, the encoding/decoding apparatus shown in the embodiment 1 or 2 can be applied as it is. The encoding/decoding unit 1003 is controlled by a control signal from the control unit 1006 and the generation of the selection signal described in the above embodiments is also controlled by the control signal.

The video signal encoded by the encoding/decoding unit 1003 is recorded onto a recording medium such as a video tape or the like by a recording/reproducing unit 1005.

The video signal recorded on the recording medium is reproduced by the recording/reproducing unit 1005 and is decoded by the encoding/decoding unit 1003 and the resultant signal can be outputted to the liquid crystal monitor 1004.

In other words, the foregoing description of embodiments has been given for illustrative purposes only and is not to be construed as imposing any limitation in every respect.

The scope of the invention is, therefore, to be determined solely by the following claims and is not limited by the text of the specifications, and alterations made within a scope equivalent to the scope of the claims fall within the true spirit and scope of the invention.

What is claimed is:

1. An image processing apparatus, comprising:
   a) an input device, having an arrangement for inputting first image data and second image data, the first image data being different from the second image data in a number of pixels of the data forming a picture;
   b) a block former, arranged for forming first blocks each comprising (m×n) pixels, from the first image data, and second blocks each comprising (i×j) pixels, from the second image data, wherein (m×n)≠(i×j);
   c) a block converter, arranged for converting the first blocks formed by said block former into third blocks of (i×j) pixels, each third block being formed based on a corresponding one of the first blocks, wherein the number of pixels of the picture formed by the first image data is changed by said block converter; and
   d) an orthogonal transformer, arranged for orthogonally transforming a version of the first image data represented by the third blocks of pixels, based on each third block of pixels, and for orthogonally transforming a version of the second image data represented by the second blocks of pixels, based on each second block of pixels.

2. An apparatus according to claim 1, wherein the first image data is data in which an aspect ratio of a picture plane is equal to (9:16) and the second image data is data in which an aspect ratio of a picture plane is equal to (3:4).

3. An apparatus according to claim 1, further comprising a discriminator for discriminating the first image data and the second image data, wherein said block former performs block formation according to an output of said discriminator.

4. An apparatus according to claim 1, further comprising an encoder for encoding image data orthogonally transformed by said orthogonal transformer.

5. An apparatus according to claim 4, further comprising an output device having an arrangement for outputting both image data encoded by said encoder and discrimination data for discriminating whether the encoded image data corresponds to the first image data or the second image data.

6. An apparatus according to claim 1, wherein the (m×n) pixels are 6×8 pixels in the vertical direction and horizontal direction, respectively, and the (i×j) pixels are 8×8 pixels in the vertical direction and horizontal direction, respectively.

7. An apparatus according to claim 1, wherein said input device includes an image capturer for photographing an image and forming at least one of the first and second image data.

8. An image processing apparatus, comprising:
   a) an input device, having an arrangement for inputting first image data and second image data, the first image data being different from the second image data in a number of pixels of the data forming a picture;
   b) a block former, arranged for forming first blocks each comprising (m×n) pixels, from the first image data, and second blocks, each comprising (i×j) pixels, from the second image data, wherein (m×n)≠(i×j); and
   c) an orthogonal transformer, arranged for orthogonally transforming a version of the first image data represented by the first blocks of pixels, based on each first block of pixels, and for orthogonally transforming a version of the second image data represented by the second blocks of pixels, based on each second block of pixels,
   wherein said orthogonal transformer converts the version of the first image data represented by the first blocks of pixels to provide (i×j) orthogonal transform coefficient data, and also provides (i×j) orthogonal transform coefficient data upon orthogonally transforming the version of the second image data represented by the second blocks of pixels, and
   wherein the number of pixels of the picture formed by the first image data is changed as a result of the orthogonal transforming performed by said orthogonal transformer.

9. An apparatus according to claim 8, wherein said orthogonal transformer orthogonally transforms at least the version of the first image data represented by the first blocks of pixels by executing a matrix arithmetic operation.

10. An apparatus according to claim 8, wherein the first image data is data in which an aspect ratio of a picture plane is equal to (9:16) and the second image data is data in which an aspect ratio of a picture plane is equal to (3:4).

11. An apparatus according to claim 8, further comprising a discriminator for discriminating the first image data and the second image data,
   wherein said block former performs block formation according to an output of said discriminator.

12. An apparatus according to claim 8, further comprising an encoder for encoding image data orthogonally transformed by said orthogonal transformer.

13. An apparatus according to claim 12, further comprising an output device having an arrangement for outputting both image data encoded by said encoder and discrimination data for discriminating whether the encoded image data corresponds to the first image data or the second image data.

14. An apparatus according to claim 8, wherein the (m×n) pixels are 6×8 pixels in the vertical direction and horizontal direction, respectively, and the (i×j) pixels are 8×8 pixels in the vertical direction and horizontal direction, respectively.

15. An apparatus according to claim 8, wherein said input device includes an image capturer for photographing an image and forming at least one of the first and second image data.

16. An image processing apparatus, comprising:
   a) an input device, having an arrangement for inputting at least one of first encoded image data which is provided by orthogonally transforming and encoding first image data, and second encoded image data which is provided by orthogonally transforming and encoding second image data, the second image data being different from the first image data in a number of pixels of the data forming a picture;
   b) a decoder, arranged for decoding encoded image data inputted by said input device, and outputting corresponding orthogonal transform coefficient data; and
   c) an inverse orthogonal transformer, arranged for inverse orthogonally transforming the orthogonal transform coefficient data to corresponding image data,
   wherein said inverse orthogonal transformer operates in either a first transform mode in which it provides image data comprising blocks of (i×j) pixels in a case where the orthogonal transform coefficient data includes (i×j) pixels, or a second transform mode in which it transforms the orthogonal transform coefficient data to corresponding image data comprising blocks of (m×n) pixels in a case where the orthogonal transform coefficient data includes (i×j) pixels, depending on provided information, wherein (m×n)≠(i×j), and
   wherein the number of pixels of the picture is changed when said inverse orthogonal transformer operates in the second transform mode.

17. An apparatus according to claim 16, wherein the first image data is data in which an aspect ratio of a picture plane is equal to (9:16) and the second image data is data in which an aspect ratio of a picture plane is equal to (3:4).

18. An apparatus according to claim 16, further comprising a discriminator for discriminating the first image data and the second image data,
   wherein said inverse orthogonal transformer operates in either the first or second transform mode, depending on an output of said discriminator.

19. An apparatus according to claim 17, wherein the (m×n) pixels are 6×8 pixels in the vertical direction and horizontal direction, respectively, and the (i×j) pixels are 8×8 pixels in the vertical direction and horizontal direction, respectively.

20. An apparatus according to claim 16, further comprising a display for displaying the image data transformed by said inverse orthogonal transformer.

21. An image processing method, comprising the steps of:
   a) an input step of inputting first image and data second image data, the first image data being different from the second image data in a number of pixels of the data forming a picture;
   b) a block forming step of forming first blocks each comprising (m×n) pixels, from the first image data, and second blocks each comprising (i×j) pixels, from the second image data, wherein (m×n)≠(i×j);
   c) a block converting step of converting the first blocks formed in said block forming step into third blocks of (i×j) pixels, each third block of pixels being formed based on a corresponding one of the first blocks of pixels, wherein the number of pixels of the picture formed by the first image data is changed in said block converting step; and d) an orthogonal transforming step of orthogonally transforming a version of the first image data represented by the third blocks of pixels, based on each third block of pixels, and orthogonally transforming a version of the second image data represented by the second blocks of pixels, based on each second block of pixels.

22. An image processing method, comprising the steps of:

a) an input step of inputting first image data and second image data, the first image data being different from the second image data in a number of pixels of the data forming a picture;

b) a block forming step of forming first blocks each comprising (m×n) pixels, from the first image data, and second blocks each comprising (i×j) pixels, from the second image data, wherein (m×n)≠(i×j); and c) an orthogonal transforming step of orthogonally transforming a version of the first image data represented by the first blocks of pixels, based on each first block of pixels, and orthogonally transforming a version of the second image data represented by the second blocks of pixels, based on each second block of pixels, wherein the step of orthogonal transforming the version of the first image data represented by the first blocks of pixels includes converting that version of the first image data to (i×j) orthogonal transform coefficient data, the performance of the step of orthogonal transforming the version of the second image data represented by the second blocks of pixels also provides (i×j) orthogonal transform coefficient data, and wherein the number of pixels of the picture formed by the first image data is changed as a result of said orthogonal transforming step.

23. An image processing method, comprising the steps of:

a) an input step of inputting first encoded image data which is provided by orthogonally transforming and encoding first image data, and second encoded image data which is provided by orthogonally transforming and encoding second image data, the second image data being different from the first image data in a number of pixels of the data forming a picture;

b) a decoding step of decoding encoded image data input in the input step, and outputting corresponding orthogonal transform coefficient data; and c) an inverse orthogonal transforming step of inverse orthogonally transforming the orthogonal transform coefficient data to corresponding image data, wherein the inverse orthogonal transforming step includes a step of selecting either a first operating mode or a second operating mode based on provided information, wherein, in a case where the first operating mode is selected and the orthogonal transform coefficient data includes (i×j) pixels, the inverse orthogonal transforming step provides image data comprising blocks of (i×j) pixels, and, in a case where the second operating mode is selected and the orthogonal transform coefficient data includes (i×j) pixels, the inverse orthogonal transforming step also includes transforming the orthogonal transform coefficient data to corresponding image data comprising blocks of (m×n) pixels, wherein (m×n)≠(i×j), and wherein in the case where second operating mode is selected and the inverse orthogonal transforming step is performed in the second operating mode, the number of pixels of the picture is changed as a result of that inverse orthogonal transforming step.

* * * * *

UNITED STATES PATENT AND TRADEMARK OFFICE
CERTIFICATE OF CORRECTION

PATENT NO. : 6,360,018 B1
DATED : March 19, 2002
INVENTOR(S) : Shingo Nozawa

It is certified that error appears in the above-identified patent and that said Letters Patent is hereby corrected as shown below:

Title page,
Item [30], Foreign Application Priority Data:
-- "April 10, 1996" should read -- October 4, 1996 --.

Column 6,
Line 65, "expression (3)." should read -- expression (3) as shown below. --

Column 7,
Line 61, "are' should read -- is --; and
Line 63, "are" should read -- is --.

Column 12,
Line 56, "and data" should read -- data and --.

Column 14,
Line 31, "second" should read -- the second --.

Signed and Sealed this

First Day of October, 2002

Attest:

Attesting Officer

JAMES E. ROGAN
Director of the United States Patent and Trademark Office